United States Patent

[11] 3,599,146

[72] Inventor Joseph A. Weisbecker
Cherry Hill, N.J.
[21] Appl. No. 722,588
[22] Filed Apr. 19, 1968
[45] Patented Aug. 10, 1971
[73] Assignee RCA Corporation

[54] MEMORY ADDRESSING FAILURE DETECTION
1 Claim, 2 Drawing Figs.

[52] U.S. Cl. .......... 340/146.1, 235/153, 340/174 ED, 340/174 B
[51] Int. Cl. .......... G11c 29/00, G06k 5/00
[50] Field of Search .......... 340/347, 174 ED, 174 AM, 166, 146.1, 174.1 C, 174 RC, 173, 173 LS, 174 M

[56] References Cited

UNITED STATES PATENTS

| | | | |
|---|---|---|---|
| 3,093,814 | 6/1963 | Wagner et al. | 340/173 (AM) |
| 3,221,310 | 12/1965 | Reach | 340/146.1 X |
| 3,270,318 | 8/1966 | Strawbridge | 340/146.1 |
| 3,461,347 | 8/1969 | Lemelson | 340/166 X |
| 3,171,100 | 2/1965 | Rajchman | 340/173 |
| 3,295,110 | 12/1966 | Brick et al | 340/174 X |
| 3,311,901 | 3/1967 | Fedde et al. | 340/174 |
| 3,460,120 | 8/1969 | Lichowsky | 340/174.1 |
| 3,126,534 | 3/1964 | Siegle | 340/174 (M) |
| 3,445,715 | 5/1969 | Dombeck | 340/173 (LSS) |

OTHER REFERENCES

Bashe, C. J., Memory Address Checking. In IBM Technical Disclosure Bulletin. 1 (1): p. 14. June 1958

*Primary Examiner*—Malcolm A. Morrison
*Assistant Examiner*—R. Stephen Dildine, Jr.
*Attorney*—H. Christoffersen

ABSTRACT: A system for detecting errors in the operation of a random access memory which is particularly useful in memories employing semiconductor decoder elements and semiconductor memory elements. Each word storage location in the memory contains a memory address parity bit for the address of that word storage location. When a word storage location is accessed for readout, the parity bit of the memory address employed is compared with the memory address parity bit stored in the word location. If the bits are different, an error signal is generated.

INVENTOR
JOSEPH A. WEISBECKER

BY Carl V. Olson
ATTORNEY

INVENTOR
JOSEPH A. WEISBECKER

BY Carl V. Olson
ATTORNEY

MEMORY ADDRESSING FAILURE DETECTION

BACKGROUND OF THE INVENTION

Random access memories, particular high speed scratch pad memories are being constructed of semiconductor elements arranged as large scale integrated circuit arrays on a single semiconductor substrate including both address decoding circuits and memory element circuits. Large scale integrated circuit memories are different from conventional magnetic memories in that the threshold characteristics of the memory elements are different, the addition of extra semiconductor circuits in a large array can be made with very little additional expense, and the localization and recognition of faults in a large integrated circuit array is both difficult and of great commercial importance. There are certain types of faults of malfunctions that can occur in an integrated circuit memory which cannot be detected by the usual parity checking of the memory address or by the parity checking of the data word read our from the memory. It is therefore a general object of this invention to provide a memory system including an improved means for detecting and indicating a fault or malfunction in the operation of the memory, particularly a fault in the addressing, address decoding and memory driving means.

SUMMARY OF THE INVENTION

In a semiconductor memory system, a fault, such as a short circuit, may occur in the memory addressing circuit. A single such fault results in the accessing of both a desired word storage location and a word storage location having an address different from the correct address. Only one bit of the incorrect address is different from the corresponding bit of the correct address. When this is so, the incorrect address has a parity which is different from the parity of the correct address. In the system of the invention, one bit position in each word storage location is used to store a memory address parity bit for the address of that word storage location. When the memory is addressed, the parity bit of the address employed to access the memory is compared with the parity bit stored in the accessed word storage location. If the bits thus compared are different, an error signal is generated.

DESCRIPTION OF THE PREFERRED EMBODIMENT

Figure 1:
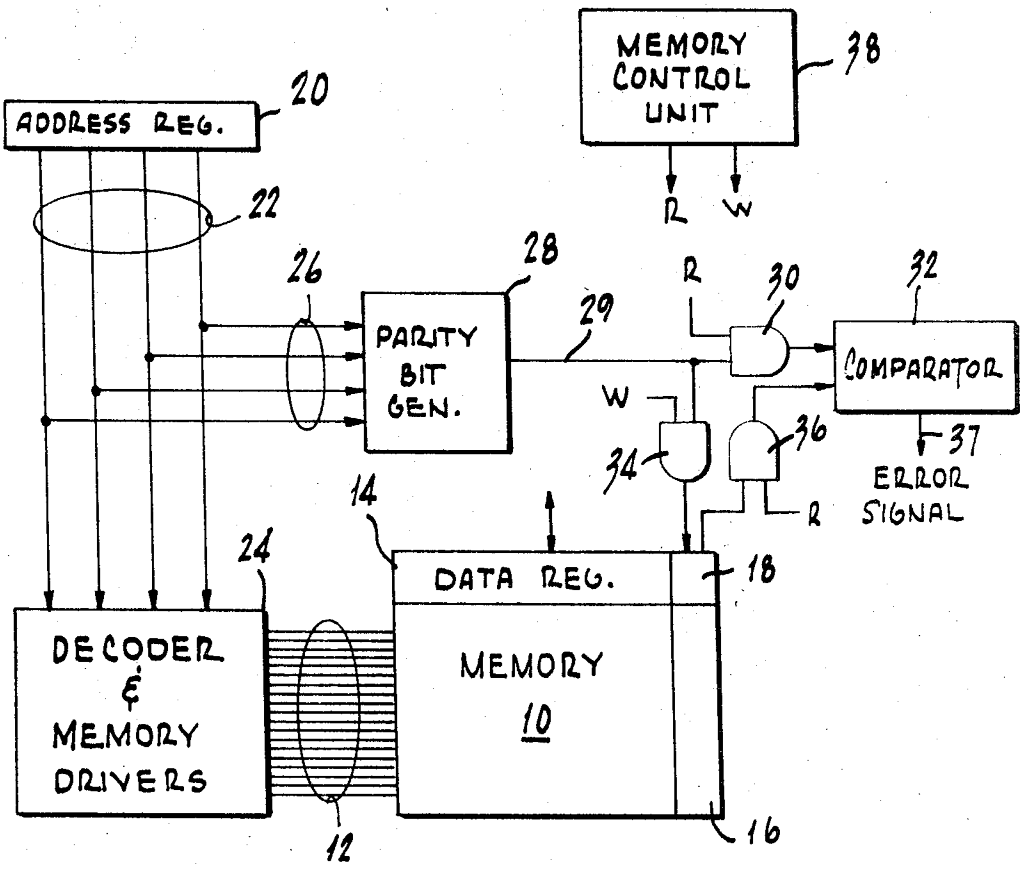
FIG. 1 is a simplified diagram of a memory system incorporating an error detection system according to the invention.

Reference is now made in greater detail to FIG. 1 wherein there is shown an array 10 of memory elements arranged in rows and columns. The memory elements of array 10 may consist of semiconductor flip-flop circuits at each crossover of row and column conductors. The memory elements existing along a row constitute one word storage location. A particular word storage location can be accessed for reading or writing by energizing a corresponding one of the word selection lines 12. The memory includes a memory data register 14 for containing a data word that is to be read into an addressed word storage location, and for containing a word read out from an addressed word storage location.

Each word storage location in the memory array includes a bit storage location 16 for storing a memory address parity bit corresponding with that particular word storage location. A parity bit register 18 is provided, like the data register 14, for containing a parity bit to be read into an addressed word storage location, and for receiving a parity bit read out from an addressed word storage location.

An address register 20 is provided for receiving from the associated computer a memory address to be used in accessing a word storage location in the memory array 10. The address register 20 is illustrated as accommodating a 4-bit address, with the four bits in the register being coupled over four lines 22 to an address decoder and memory driver unit 24. Each of the four lines 22 for the four bits of the address consists of a pair of conductors conveying the bit signal and its complement. The four line pairs 22 are also connected over four line pairs 26 to a conventional parity bit generator 28. The output 29 of the parity bit generator 28 is coupled through an "and" gate 30 to a comparator 32. The output 29 of parity bit generator 28 is also coupled through an "and" gate 34 to the memory address parity bit register 18 of memory array 10. The contents of parity bit register 18 is coupled through an "and" gate 36 to the other input of comparator 32. The comparator 32 has an error-indicating signal output 37. A memory control unit 38 provides the conventional timing and operating controls for all components of the memory system, including read pulses R applied to "and" gates 30 and 36, and write pulses W applied to "and" gate 34.

In the operation of the system of FIG. 1, a memory address is applied from an associated computer to the memory address register 20. The address is decoded in the unit 24 with the result that a single one of the lines 12 is energized, and a single corresponding one of the memory word locations is accessed. If the memory access is for writing information, the contents of the data register 14 and the parity bit register 18 are transferred to the accessed word storage location. The contents of the data register 14 at this time was supplied from the associated computer. The contents of the parity bit register 18 at this time was supplied through the "and" gate 34 from the parity bit generator 28, which in turn generated the parity bit from the memory address present and available over lines 22 and 26.

When the stored word is to be read out from the memory, the contents of the address register 20 is decoded and employed as before to access the corresponding memory word location in memory 10. The accessed word is read out to the date register 14 and the parity bit register 18. At this time, the memory address parity bit generated in the unit 28 is applied through "and" gate 30 to the comparator 32. At the same time, the contents of the parity bit register 18 is applied through an "and" gate 30 to the comparator 32. If the two parity bits applied to the comparator 32 are different, an error signal is produced on the comparator output lead 37. The occurrence of an error signal on lead 37 is used by the computer to prevent the use of the incorrect information then present in the data register 14, and to initiate diagnostic routines or other action leading to correction of the fault or malfunction. The occurrence of an error signal on lead 37 is indicative a type of fault which will be described in connection with a description of the operation of the embodiment of FIG. 2.

Figure 2:
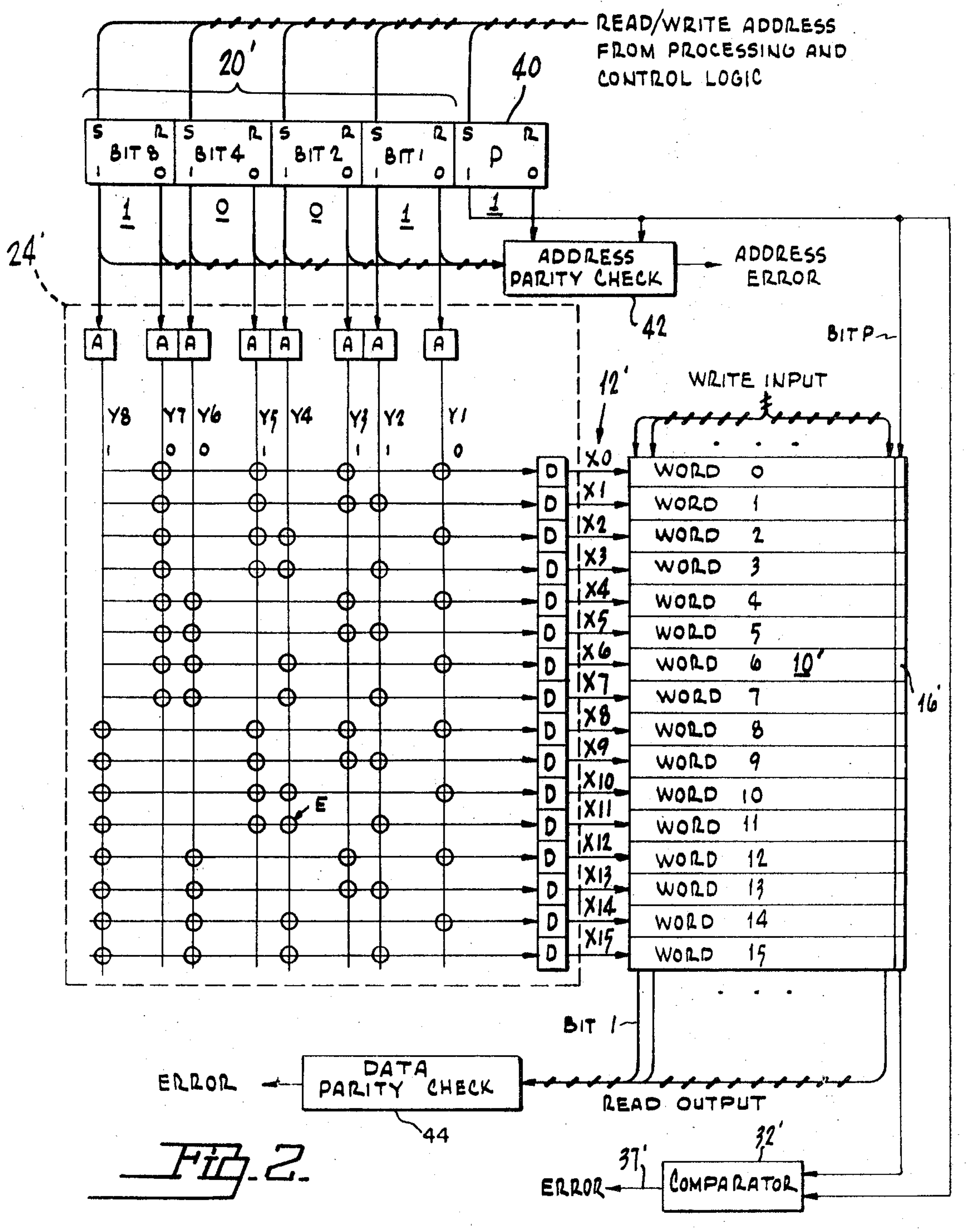
FIG. 2 is a more detailed diagram of an alternative embodiment of the invention.

FIG. 2 shows an alternative memory system including the memory failure detection feature of the invention. The units in FIG. 2 corresponding with units in FIG. 1 are each given the same reference numeral with a prime (′) designation added. The system of FIG. 2 differs from the system of FIG. 1 in including a parity bit register 40 associated with the address register 20′. The memory address supplied from the computer includes both the bits of a memory address and an appropriate accompanying parity bit. An address parity checking circuit 42 is provided for checking the parity of the contents of the address register 20′, 40. A data parity checking circuit 44 is provided for checking the parity of the data portion of each word read out from the memory 10′.

The decoder and memory driver unit 24′ is shown in greater detail to include column conductors Y1 through Y8, and row conductors X0 through X15. The column conductors are driven by amplifiers A responsive to the contents of the address register 20′. The row conductors are connected to drivers D each of which accesses a corresponding word storage location in memory 10′. Circles drawn at selected intersections or cross-overs of the row and column conductors in decoder 24′ represent active semiconductor devices such as transistors.

In the operation of the addressing and decoding units in FIG. 2, certain of the column conductors are energized in accordance with the contents of the address register 20'. If the register contains the memory address 1001, the column conductors y2, Y3, Y5 and Y8 are energized. In this case, solely the row conductors X9 is selected and energized because it is the only row conductor having the indicated pattern of couplings to the column conductors. The word storage location 9 is thus accessed for the writing in and reading out of information. When a word is written into a word storage location, the memory address parity bit from register 40 is stored in the addressed word location in an address parity bit location 16'. When a word storage location is accessed for readout, the parity bit read out with the word is compared in comparator 32' with the contents of the memory address parity bit register 40. If the parity bits are different, an error signal is generated on output lead 37'. Such an error indication can occur only during the readout portion of the memory cycle.

When there is an error signal from the comparator 32', the cause of the error may be a short circuit in the decoder 24'. For example, the semiconductor decoder coupling element designated E may have failed. In this case, the memory address 1001 employed to access word storage location 9 also results in the access of word storage location 11. Therefore, the intentional addressing and writing of the information and the memory address parity bit into word storage location 9 operates also, though incorrectly, to cause the same information and the same memory address parity bit to be written into word storage location 11.

Subsequently, when address 1001 is employed to intentionally address word storage location 9 for the purpose of reading out the stored word, the readout is accomplished correctly without any error indication. This is because word storage locations 9 and 11 both have the same contents, which should be solely in word location 9. However, when address 1011 is employed to access word storage location 11 for the purpose of reading out the information stored therein, an error signal is generated at the output 37' of the comparator 32'. The error signal results from a comparison in the comparator 32' of the memory address parity bit from register 40 and the parity bit from the bit location 16' of word storage location 11.

The parity bit that was stored with word 11 belongs to the word 9 address 1001, and it is different from the parity bit associated with the word 11 address 1011. The parity bits are necessarily different because the addresses 1001 and 1011 differ at solely one bit location. The single bit difference results from a single fault in the decoder 24'. A single fault in the decoder 24' causes an error of a type which cannot be detected by the conventional address parity checking circuit 42 or the conventional data parity circuit 44. The error is however detected by the parity bit checking arrangement including comparator 32'. The described malfunction due to a short circuit in the decoder coupling element E can also be caused by any other fault along the column decoder Y4 conductor which causes the conductor to be maintained at a high or "1" voltage value.

As soon as a fault of the type described is encountered, the resulting error signal indicates the need for corrective action. In the event that there are simultaneously two fault conditions in the decoder 24', the existence of the two faults may or may not be detected by the comparator 32', depending on the particular parities involved. However, any odd number of faults inevitably results in an error signal.

What I claim is:

1. In a random access memory system having addressable word storage locations, the combination of a source of memory addresses each having an associated memory address parity bit, decoder means utilizing a memory address from said source to address a word storage location in the memory, means operative when writing information into an addressed word storage location to store the associated address parity bit in the addressed word storage location, and means operative when reading information from an addressed word storage location to compare the parity bit of the memory address employed with the parity bit read out from the addressed word location, and to generate an error signal if the bits are different.